United States Patent
Kleissen et al.

(10) Patent No.: US 7,171,726 B2
(45) Date of Patent: Feb. 6, 2007

(54) HINGE CONSTRUCTION AND HINGE ACTUATOR, IN PARTICULAR FOR A WING MIRROR OF A MOTOR VEHICLE

(75) Inventors: Werner John Peter Kleissen, Deurningen (NL); Peter Alexander Hamming, Zeist (NL); Marinus Jacobus Maria Van Zuijlen, Jaarsveld (NL); Paulus Gerardus Maria Van Stiphout, Woerden (NL); Stefan Frits Brouwer, The Hague (NL)

(73) Assignee: Eaton Corporation, Cleveland, OH (US)

( * ) Notice: Subject to any disclaimer, the term of this patent is extended or adjusted under 35 U.S.C. 154(b) by 243 days.

(21) Appl. No.: 10/485,239

(22) PCT Filed: Aug. 1, 2002

(86) PCT No.: PCT/NL02/00520

§ 371 (c)(1),
(2), (4) Date: Aug. 19, 2004

(87) PCT Pub. No.: WO03/011642

PCT Pub. Date: Feb. 13, 2003

(65) Prior Publication Data

US 2005/0000058 A1 Jan. 6, 2005

(30) Foreign Application Priority Data

Aug. 2, 2001 (NL) .................................... 1018687

(51) Int. Cl.
*E05D 11/10* (2006.01)

(52) U.S. Cl. ............................ 16/235; 16/334; 16/344; 16/321; 16/331; 296/1.11

(58) Field of Classification Search ................. 16/235, 16/343, 344, 347, 330, 334, 303, 321, 331; 296/1.11, 152
See application file for complete search history.

(56) References Cited

U.S. PATENT DOCUMENTS

| | | | | |
|---|---|---|---|---|
| 498,551 | A | * | 5/1893 | Howarth ...................... 16/334 |
| 5,961,220 | A | * | 10/1999 | Som et al. .................. 384/416 |
| 6,092,334 | A | * | 7/2000 | Kim ............................... 49/8 |
| 6,532,627 | B2 | * | 3/2003 | Audisio ....................... 16/334 |
| 6,684,455 | B1 | * | 2/2004 | Mertin ......................... 16/334 |

* cited by examiner

*Primary Examiner*—Chuck Y. Mah
*Assistant Examiner*—Michael J. Kyle
(74) *Attorney, Agent, or Firm*—Anna M. Shilt; Roger A. Johnston (57) ABSTRACT

A hinge construction comprising two hinge members provided with a guide track. The guide tracks of each of the hinge members comprise at least three substantially flat, circular segment-shaped track parts, which each extend between first and second track ends and which are distributed at uniform intermediate distances over a corresponding circular circumference, so that the track parts of the hinge members pairwise form a guide for at least one guide element. The hinge members are pivotable relative to each other between a first angular position in which the guide elements are received in the guides so as to be displaceable along the track parts, and a second angular position in which the guide elements are received in the guides so as to be clamped between first and second track ends of the track parts.

17 Claims, 13 Drawing Sheets

HINGE CONSTRUCTION AND HINGE ACTUATOR, IN PARTICULAR FOR A WING MIRROR OF A MOTOR VEHICLE

This invention relates to a hinge construction, in particular for a wing mirror of a motor vehicle, comprising two hinge members which are arranged so as to be pivotable relative to a common rotation axis.

Such a hinge construction is generally known and is used in a hinge actuator with which a mirror housing of a wing mirror is pivotally connected with the body of a car. The mirror housing is pivotable about a substantially vertical axis between an operating position in which the mirror housing projects substantially sideward relative to the body of the car, and an extreme fold-in position in which the mirror housing extends substantially rearwards along the body of the car. Accordingly, for instance during parking, the mirror housing can be folded in from the operating position, so that the free end of the mirror housing comes to lie closer to the body of the car and the chance of damage can be reduced.

To make the rotation limited between the fold-in position and the operating position possible, the two hinge members of the known hinge construction are designed as superposed discs. In the contact surface of the first hinge member, there are provided two guide tracks which are designed as guide tracks extending along the circumference of a circle around the rotation axis between two first track ends, while the second hinge member is provided at the contact surface with two cams which can cooperate with the guide tracks. During folding out to the operating position, the hinge members pivot relative to each other and the cams are guided through the grooves until they each abut against a track end. During folding in from the operating position, the cams are guided in the opposite direction through the grooves until a stop corresponding to the extreme folding position has been reached.

Folding in and folding out are carried out with the aid of an electrical drive which drives the relative pivotal motion of the hinge members and which automatically cuts out as soon as one of the stops has been reached.

For the sake of safety, it has been elected to design the hinge construction such that from the operating position the mirror housing can additional be pivoted further about the rotation axis, so that the mirror housing can be folded over from the operating position to an extreme fold-over position in which the mirror housing extends substantially forwards along the body of the car.

To that end, in the known hinge device, the hinge members are under spring action in axial direction, so that the hinge members can be pivoted further from the operating position in that the cams adjacent the track ends run out of the grooves, and the hinge members are pressed apart in axial direction, against the spring action. Upon farther pivoting into the extreme fold-out position, the cams are guided over the parts of the contact surfaces of the hinge members that are located between the grooves. In this way, when an obstacle hits the mirror housing, the mirror housing can pivot along in the driving direction about the rotation axis, so that damage to the mirror housing and/or the obstacle can be reduced. Folding back from the fold-over position as far as or beyond the operating position is then carried out electronically.

A disadvantage of the known hinge construction is that during adjustment between the fold-in position and the operating position, a relatively large frictional force must be transmitted, so that the electrical drive must be made of relatively heavy design. In addition, also the frictional force between the cam and the contact surface of the first hinge member is relatively large during pivoting between the operating position and the extreme fold-over position.

A further disadvantage of the known hinge construction is that only two guide tracks can be arranged along the circumference of the circle, because it is usually required that a mirror housing can be pivoted through an angle of about 80° between the fold-in position and the operating position. The guide tracks must therefore extend over a circular arc of at least 80° each, so that if more than two guide tracks are provided, there is insufficient intermediate space available to guide the cams between the operating position and the extreme fold-over position without the cams ending up in the next guiding groove and this making it impossible to bring them back again with the aid of the electrical drive.

This has as a disadvantage that the mirror housing is unstable in the fold-over position, since it rests on just two cams. Since the hinge construction must in practice be made of compact and robust design, it is not desirable to provide several concentrically arranged guiding grooves.

The object of the invention is to provide a hinge construction of the type mentioned in the preamble, with which, using a relatively simple construction, and while maintaining the advantages, the disadvantages can be avoided.

To that end, a hinge construction according to the invention comprises two hinge members provided with a guide track, which hinge members are arranged so as to be pivotable relative to a common rotation axis, so that the guide tracks together form a guide for guide elements displaceably received between the hinge members, which guide elements, distributed at fixed intermediate distances along the circumference of a circle located around the rotation axis, are mounted on a common carrier, the guide tracks of each of the hinge members comprising at least three substantially flat, circular segment-shaped track parts, which each extend between first and second track ends and which are distributed at a uniform intermediate distance over a corresponding circular circumference, so that the track parts of the hinge members pairwise form a guide for at least one guide element, such that the hinge members are pivotable relative to each other between a first angular position in which the guide elements are received in the guides so as to be displaceable along the track parts, and a second angular position in which the guide elements are received in the guides so as to be clamped between first and second track ends of the track parts.

What is achieved by including the guide elements displaceably between the hinge members is that they can fulfill a bearing function, so that the friction between the hinge members can be reduced considerably.

What is achieved due to the guide elements in the guides being displaceable along track parts of both hinge members is that the length of two track parts is available for realizing a pivotal motion of the hinge members relative to each other. As a result, it is possible, compared with the prior art, that for a predetermined limited rotation angle, the track length of the guide track parts is chosen to be smaller. Preferably, the track parts per hinge member are located in one flat plane.

By including the guide elements on a common carrier, such as a cage or aperture plate, it can be ensured that the guide elements remain distributed within the hinge construction in the correct manner and the hinge members can be stably supported on each other. With a view to a statically determined force transmission, preferably three guide elements are then used.

Preferably, the guide elements with their common carrier are included between the hinge members as a detachable bearing element.

The rolling elements are then preferably bearing-mounted in the common carrier at fixed intermediate distances.

To lower the friction between the hinge members, the guide elements are preferably designed as rolling elements, such as cylinders, cones or tuns. Of course, the guide elements can also be designed as sliding elements, such as cubes. Preferably, the guide elements are designed as spherical or ball-shaped rolling elements.

With the hinge construction according to the invention, it is possible to pivot the hinge members of the hinge construction through a maximum pivoting angle relative to each other between two extreme angular positions in which the guide elements are included in the guides so as to be clamped between first and second track ends of the track parts. It will be clear, however, that the hinge construction can be provided with stop means, so that it is pivotable between a first extreme angular position in which at least one of the hinge members cooperates with a stop and a second extreme angular position in which the guide elements are included in guides so as to be clamped between first and second track ends of the track parts. When the hinge construction forms part of a hinge actuator for a wing mirror of a motor vehicle, the first extreme angular position can correspond, for instance, with the extreme fold-in position of the wing mirror, and the second angular position can correspond with the operating position of the wing mirror.

In an advantageous embodiment, the hinge members of the hinge construction are provided with auxiliary guide track parts linking up with the track parts, which auxiliary guide track parts pairwise form an auxiliary guide, such that the hinge members, from the second angular position, are pivotable further into a third angular position in which the guide elements are received in the auxiliary guides. When the hinge construction is used in a hinge actuator for a wing mirror, a fold-over position can thus be realized. An extreme fold-over position can then be realized by the use of a further stop. In the fold-over position, the guide elements can guarantee a relatively low friction between the hinge members, and the hinge members can transmit statically determined forces.

Preferably, the auxiliary guide track parts per hinge member are located in one flat plane.

In an advantageous embodiment of the invention, the guide tracks and the auxiliary guide track parts per hinge member link up via the track ends to form a stepped annular guide track. Such a construction can be realized in a simple manner, for instance by forming the annular track from sheet material by means of die-cutting.

In a further advantageous embodiment of the invention, the common carrier cooperates, with the aid of a catch device, with at least one of the hinge members. As a result, the hinge members can be prevented from getting into an intermediate angular position in which at least one guide element cooperates with a guide track part of a first hinge member on the one hand and with an auxiliary track part of another hinge member on the other. The catch device can then comprise, for instance, a cam arranged on the common carrier, which cam cooperates with a stop arranged on a hinge member.

To prevent a guide element cooperating with more than one guide or auxiliary guide, at least one of the hinge members can be provided with a limiter which limits pivotal motion of the hinge members relative to each other when the hinge members are in an intermediate angular position in which at least one guide element cooperates with a guide track part of a first hinge member on the one hand and with an auxiliary guide track part of another hinge member on the other hand. Such a limiter preferably comprises a stop which extends between the hinge members up to a length less than the sum of the distance between the planes in which the track parts and the auxiliary track parts in the two hinge members are located.

In a further advantageous embodiment, the hinge members cooperate under spring action. This is advantageous in particular in embodiments where the distance between the hinge members increases when the hinge members pivot further from the second angular position to the third angular position in which the guide elements are located outside the guides, in the auxiliary guides. It is noted that it is also possible to make the part of a hinge member that links up with the guide tracks from a resilient material, so that through deformation of the material the intermediate element can be received and the distance between the hinge members can remain the same. Such a construction can be formed in an elegant manner by providing the contact surface of at least one of the hinge members with a soft elevation by means of two-component injection molding.

In a still further embodiment, the guide track parts are provided with a recess adjacent at least one track end. What can thus be accomplished is that the guide elements can to some extent be locked in a position in which they are clamped between first and second track ends of the guides. Thus, the second angular position of the hinge construction can to some extent be locked, which may be of advantage, for instance in a hinge actuator for a wing mirror in defining the operating position. A similar effect can be achieved by providing the first and/or the second guide tracks adjacent at least one track end with an elevation, so that the intermediate element can be clamped in the second angular position.

Further advantageous embodiments of the invention are set forth in the subclaims.

The invention also relates to a hinge actuator and a wing mirror unit provided with a hinge construction according to the invention.

The invention will now be further elucidated on the basis of an exemplary embodiment represented in a drawing. In the drawing.

It is noted that the figures only concern schematic representations of a preferred embodiment of the invention. The same or corresponding parts are indicated by the same reference numerals.

Figure 1:
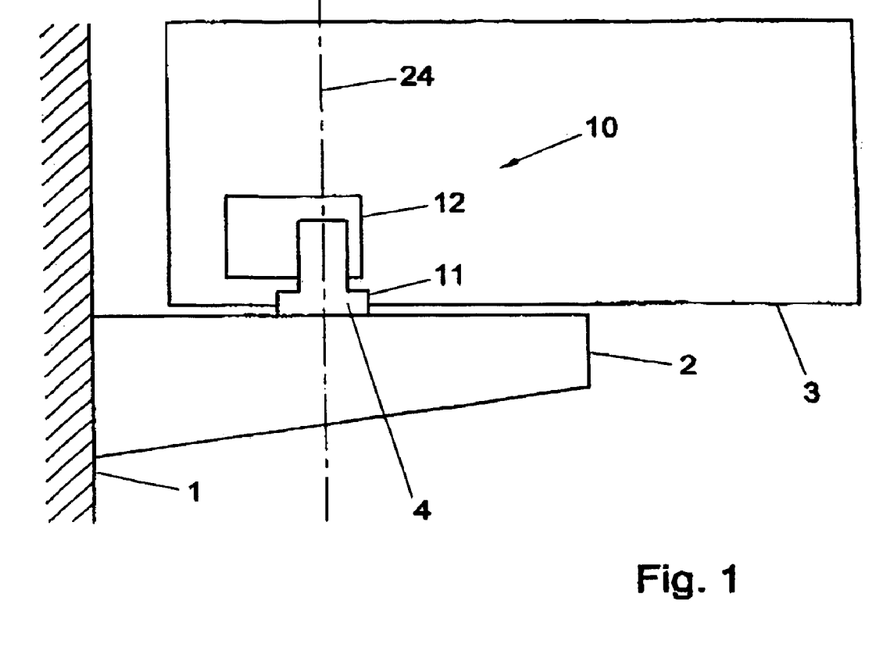
FIG. 1 shows a schematic perspective view of a schematic front view of a vehicle with a wing mirror.

FIG. 1 schematically shows a front view of a sidewall of a vehicle 1, on which is mounted a support 2 extending substantially horizontally. Mounted on the support 2 is a mirror housing 3, pivotable about a base shaft 4 extending substantially vertically. The mirror housing 3 is substantially cup-shaped, as is clearly represented in FIGS. 2A–C, with the bottom of the cup shape directed forward. In the mirror housing 3, a mirror plate 5 is arranged, substantially in a vertical plane, which mirror plate 5 is pivotable relative to the mirror housing 3, about a hinge point 6. More particularly, in the mirror housing 3 a mirror adjusting mechanism is disposed, which is arranged to set the position of the mirror plate 5 through a hinge movement about two mutually perpendicular axes, viz. a vertical axis and a horizontal axis. Since the nature and construction of that mirror adjusting mechanism do not constitute any subject matter of the present invention, and a knowledge thereof is not necessary for a skilled person to properly understand the present invention, these will be not be described in detail. Suffice it to note that use can be made of a mirror adjusting mechanism known per se.

In FIG. 1 it is further indicated schematically that the mirror housing 3 comprises a hinge actuator 10, of which a first part, which will be designated as mirror base 11, is mounted on the support 2 and carries the base shaft 4, while a frame part 12 is mounted on the mirror housing 3. The frame part 12 with the mirror housing 3 is pivotable about the centerline of the base shaft 4 which forms a rotation axis 24. The hinge actuator 10 comprises a hinge construction 20 with a first hinge member 21 which is integrated with the mirror base 11, or is connected thereto, and a second hinge member 22 which is connected to the frame part 12 or is integrated therewith.

Figure 2A:
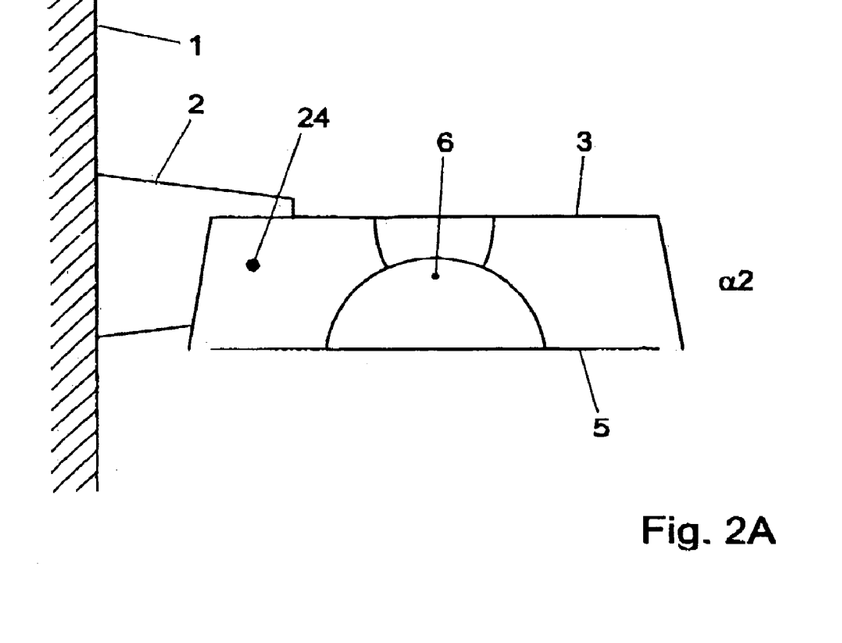
FIGS. 2A–2C schematically show a top plan view of a vehicle with a wing mirror in an operating position (FIG. 2A), a fold-in position (FIG. 2B) and a fold-over position (FIG. 2C)
Figure 2B:
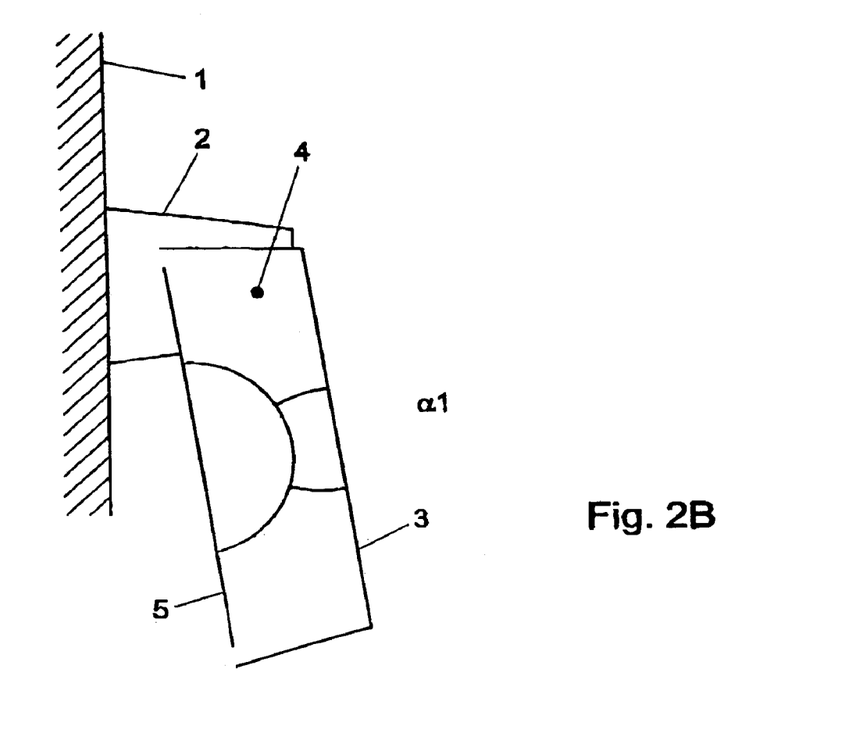
Figure 2C:
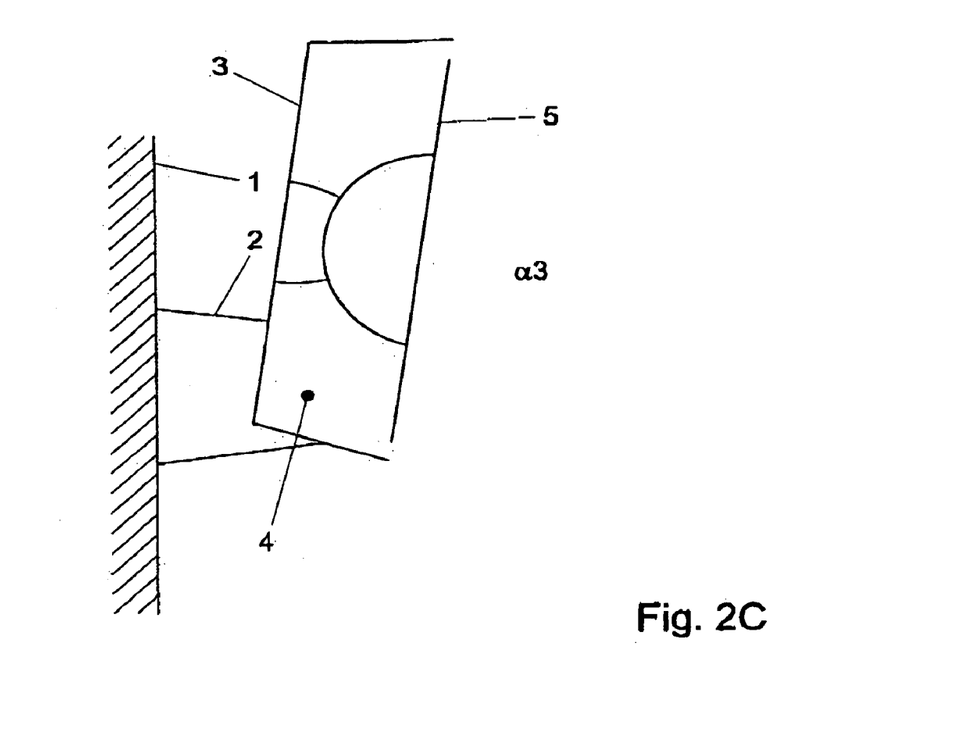

FIGS. 2A–C schematically show, for a right wing mirror, a top plan view of the vehicle 1 with the mirror housing 3. During normal use, the mirror housing 3 is in an operating position (FIG. 2A) with the mirror plate 5 extending substantially perpendicularly to the sidewall of the vehicle 1. This normal operating position is also designated as fold-out position.

FIG. 2B schematically illustrates a position in which the mirror plate 5 faces towards the vehicle 1. The mirror housing 3 can be brought from the normal operating position to such a position through a rearward hinge movement about the hinge shaft 4 (folding in), and the mirror housing 3 can be returned from that position to the normal operating position through a forward hinge movement about the hinge shaft 4 (folding out). It will be clear that the hinge actuator can be provided with a stop to prevent the possibility of the mirror housing 3 being folded in so far as to touch the vehicle 1. Such a stop thus defines an extreme fold-in position.

FIG. 2C schematically illustrates a position in which the mirror plate 5 faces away from the vehicle 1. The mirror housing 3 can be brought from the normal operating position to such a position through a forward hinge movement about the hinge shaft 4 (folding over), and the mirror housing 3 can be returned from that position to the normal operating position through a rearward hinge movement about the hinge shaft 4 (folding back). It will be clear that the hinge actuator can also be provided with a stop to prevent the possibility of the mirror housing 3 being folded over so far as to touch the vehicle 1. Such a stop thus defines an extreme fold-over position.

Figure 3:
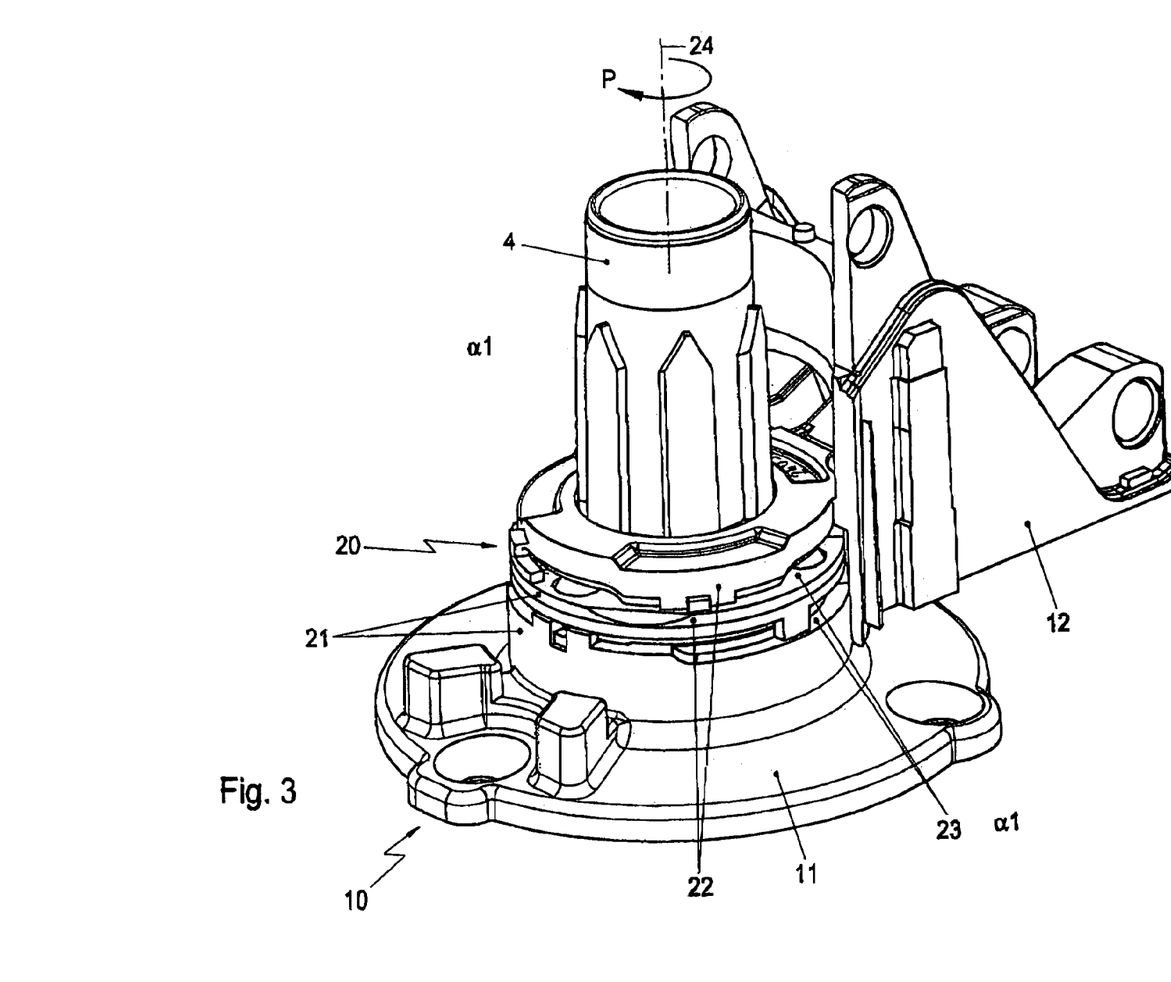
FIG. 3 shows a schematic perspective view of a hinge actuator with a hinge construction according to the invention in the first angular position ($\alpha 1$)
Figure 4:
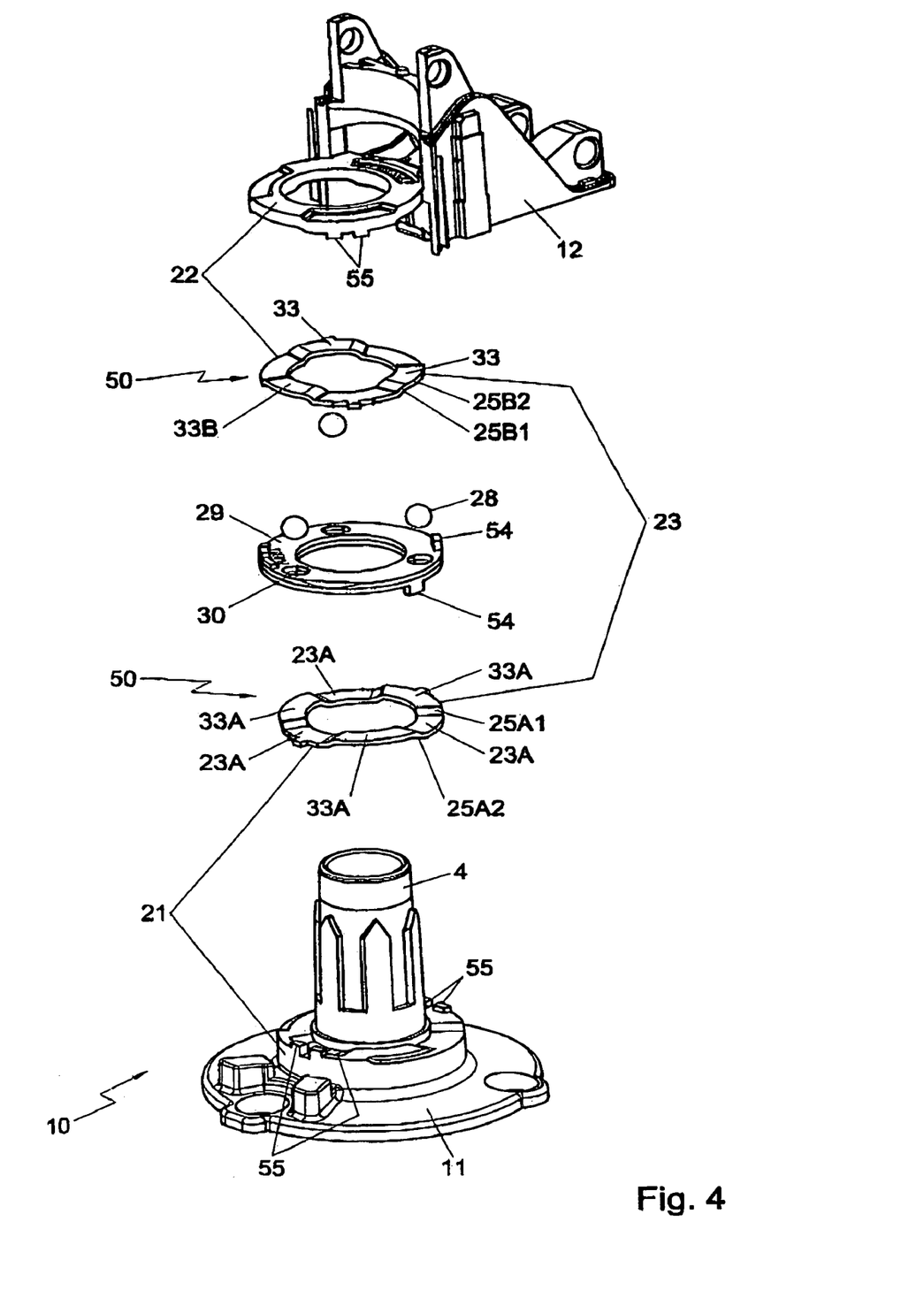
FIG. 4 shows a schematic perspective view of the hinge actuator of FIG. 3 in disassembled condition.

Referring to FIGS. 3 and 4, there is shown a hinge construction 20 according to the invention which is integrated into a hinge actuator 10. The hinge construction 20 comprises two hinge members provided with a guide track, viz. a first hinge member 21 which is integrated with the mirror base 11, and a second hinge member 22 which is integrated with the frame part 12. The first hinge member 21 is provided with three guide track parts 23A, each extending between two first track ends 25A1, 25A2.

The first hinge member 21 is further provided with auxiliary guide track parts 33A linking up with the track parts 23A. The track parts 23A of the first hinge member 21 are located in a first flat plane, while the auxiliary guide track parts are located in a second flat plane, spaced therefrom. The guide track parts 23A and the auxiliary guide track parts 33A link up to form a stepped annular guide track.

In FIG. 4 it is shown that the stepped annular guide track is formed as a loose ring 50, die-cut from sheet material. It will be clear that the stepped, annular track can optionally form one whole, and also with the mirror base 11 and/or the frame part 12.

The second hinge member 22 in this embodiment is identical to the first hinge member 21 and is provided with a loose ring 50 with three guide track parts 23B, each extending between two second track ends 25B1, 25B2.

The hinge members 21, 22 are arranged so as to be pivotable relative to a common rotation axis 24, such that the guide track parts 23A, 23B together form a guide 23 for guide elements 28 displaceably received between the hinge members. The guide elements are designed as rolling elements, for instance steel balls, and, while being distributed at a fixed intermediate distance along the circumference of a circle located around the rotation axis, are received on a common carrier 29. The common carrier 29 is designed as an annular disc which is provided with three recesses 30 in which the guide elements 28 are rotatably bearing-mounted at fixed positions. The common carrier 29 then forms a cage which carries three guide elements, so that the hinge members 21, 22, while including the cage as a detachable intermediate element, are spaced apart along the rotation axis 24 in axial direction.

The guide track parts 23A, 23B are substantially flat, circular segment-shaped track parts uniformly distributed along the circumference of the circle located around the rotation axis 24. The track parts 23A, 23B pairwise form a guide 23 for one guide element 28.

The hinge members 21, 22 are pivotable relative to each other about the rotation axis 24 between a first angular position α1, shown in FIG. 3, in which the guide elements are displaceably received in the guides 23, and a second angular position α2 (shown in FIG. 5), in which the guide elements 28 are received in the guides 23 so as to be clamped between first track ends 25B1 and second track ends 25A2 of the respective guide track parts 23A, 23B.

Figure 5:
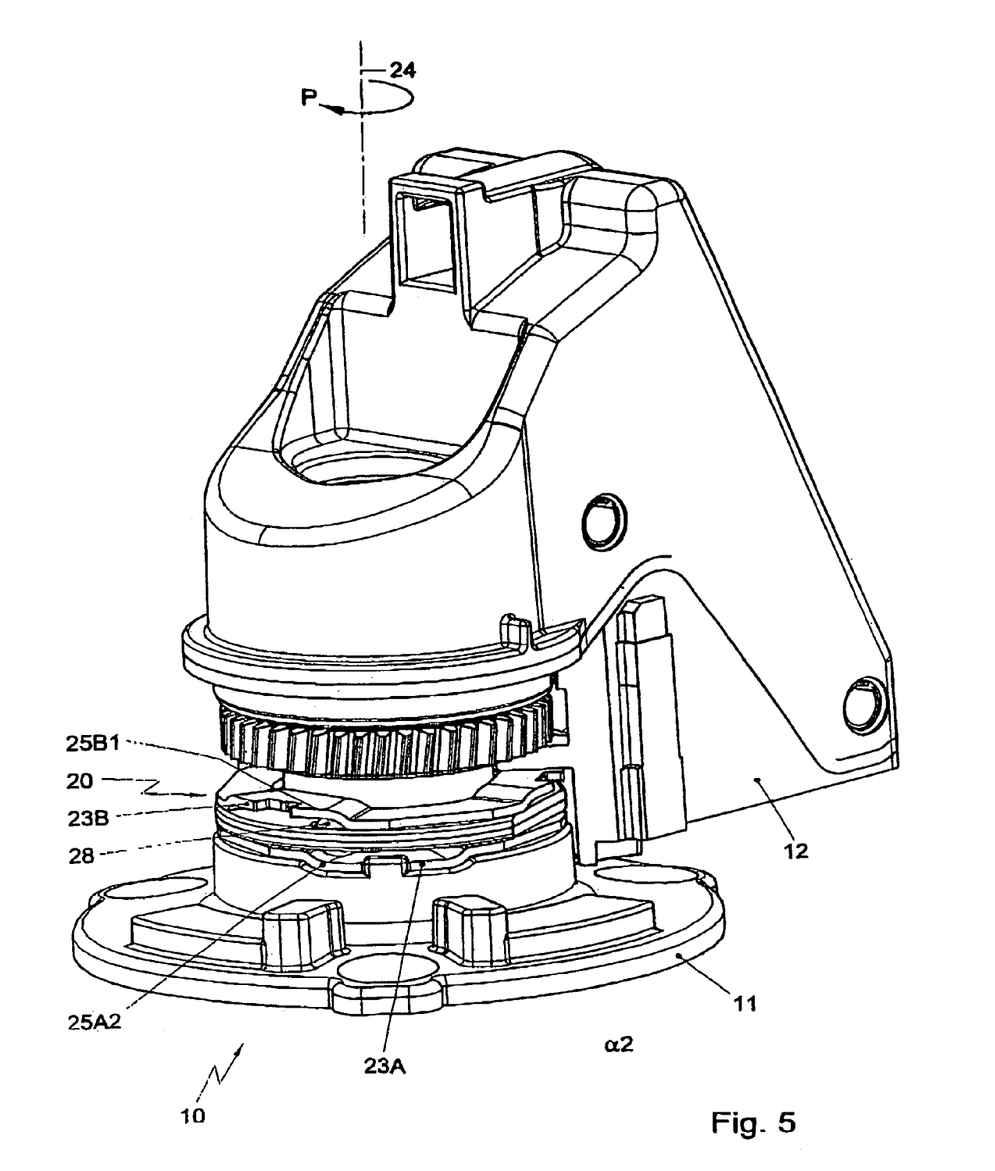
FIG. 5 shows a schematic perspective view of the hinge actuator of FIG. 1 in the second angular position ($\alpha 2$)

In FIG. 3 the hinge actuator is shown in the fold-in position, while FIG. 5 represents the hinge actuator 10 in the operating position. The first angular position α1 corresponds with any angular position between the fold-in position and the operating position, while the second angular position α2 corresponds with the operating position. During pivotal movement, the guide elements 28 designed as intermediate elements can move along both track parts 23A, 23B of the guide 23, so that the total length of the guide 23 is built up from the length of the separate guide track parts 23A and 23B. The position shown in FIG. 3 can then correspond with the fold-in position of a mirror housing 3 as shown in FIG. 2B, while the position shown in FIG. 5 can correspond with the operating position of the mirror housing 3 as shown in FIG. 2A.

Figure 6:
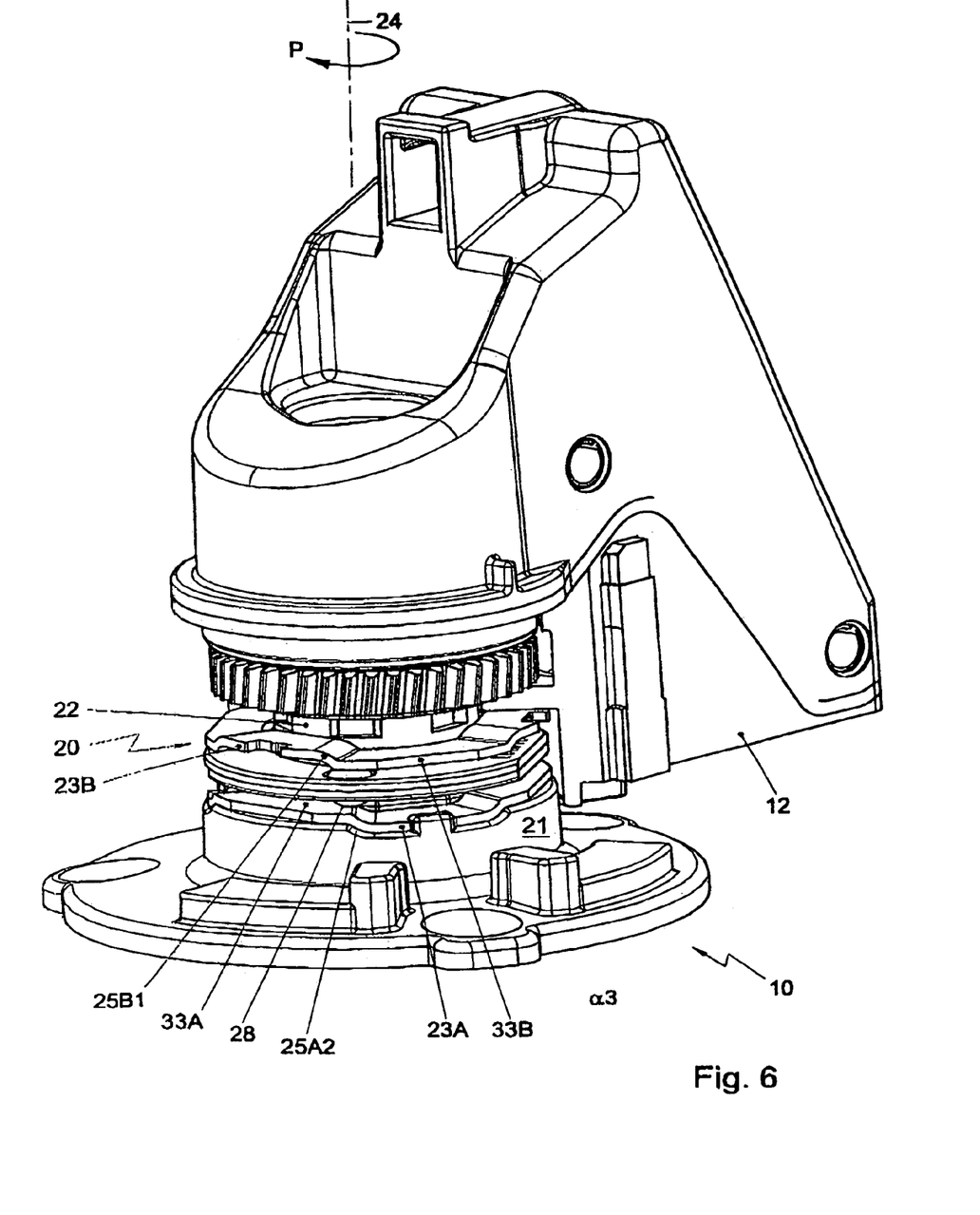
FIG. 6 shows a schematic perspective view of the hinge actuator of FIG. 1 when it has just entered the third angular position ($\alpha 3$)

In FIG. 6, it is shown that the hinge members 21, 22 are further pivotable from the second angular position α2 in the direction of the arrow P as far as a third angular position α3, in which the guide elements 28 are received in the guides 33 formed by the auxiliary guide track parts 33A, 33B.

It is noted that through an appropriate choice of the length of the guide track parts 23A, 23B, it is possible to clamp the guide elements 28 between track ends 25 in the fold-in position as well. In this exemplary embodiment, the guide elements 28 can then be clamped, in the fold-in position, between the first track end 25A1 of the guide track part 23A1 of the first hinge member 21 and the second track end 25B1 of the second guide track part 25B of the second hinge member 22. However, when the hinge actuator 10 is provided with a separate stop for defining the fold-in position, the hinge actuator 10 can be used for a series of pivotal angles, and both for left and for right wing mirrors.

During the transition from the second angular position α2 shown in FIG. 5 to the third angular position α3 shown in FIG. 6, the first hinge member 21 and the second hinge member 22 are moved apart against the spring action of a spring, not shown. The guide elements 28 then run over a preferably slightly inclining guide intermediate portion of the annular stepped guide track, formed by the track end 25.

Figure 7:
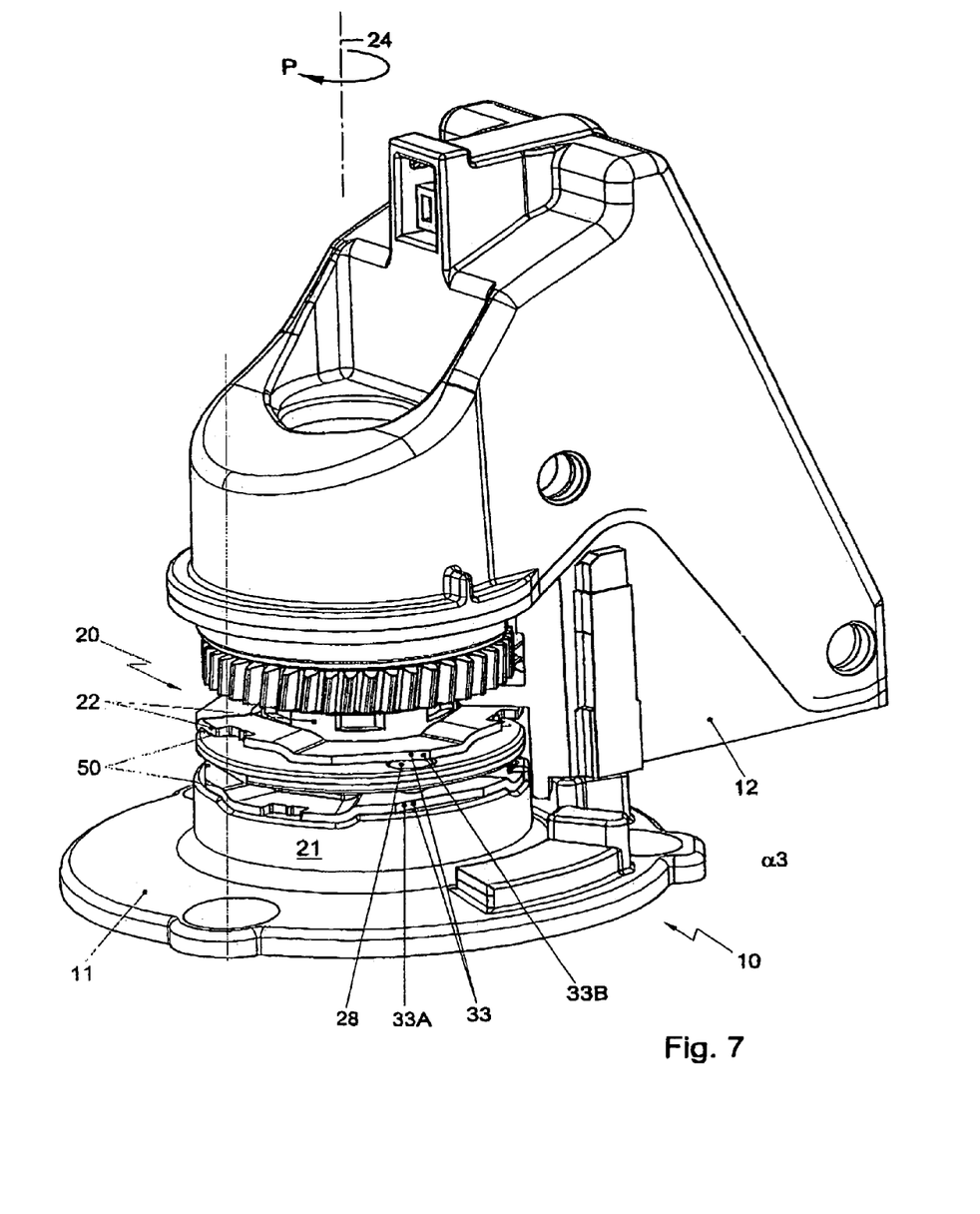
FIG. 7 shows a schematic perspective view of the hinge actuator of FIG. 1 in the fold-over position.
Figure 8:
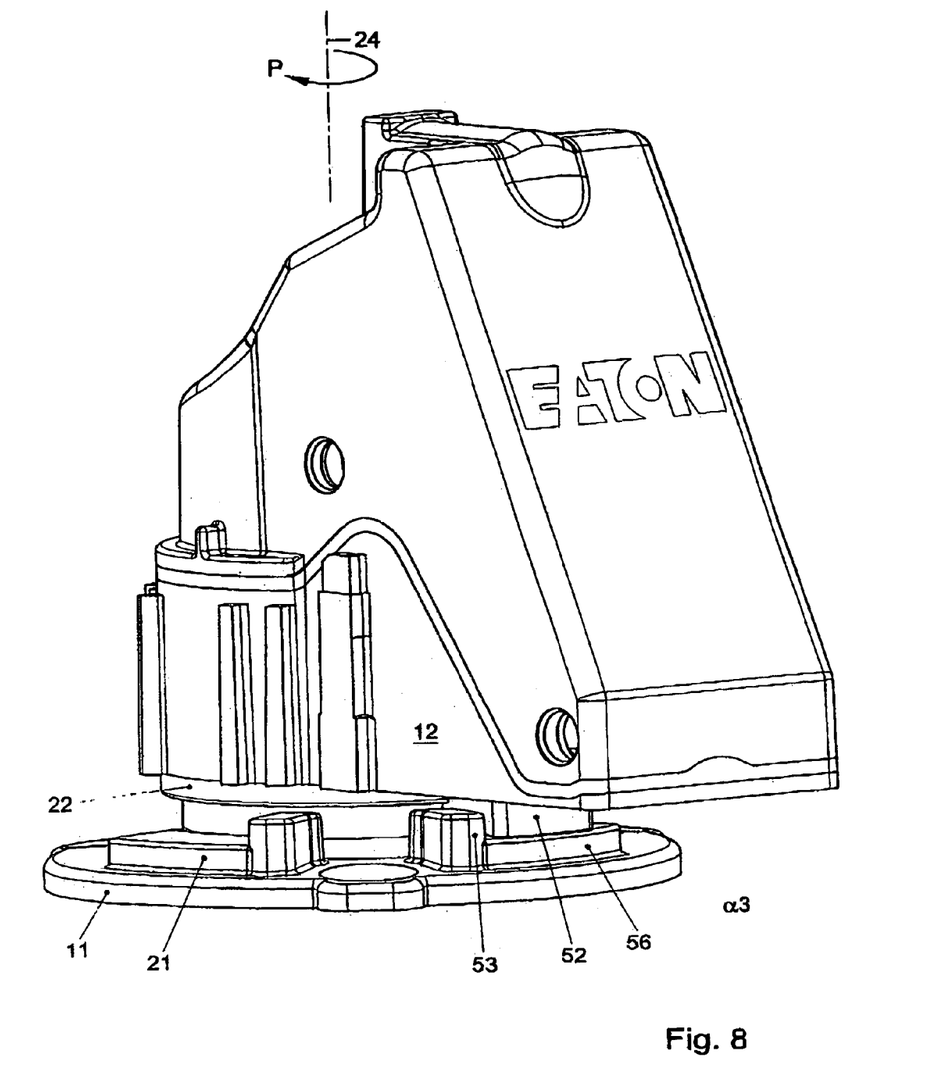
FIG. 8 shows a schematic perspective view of the hinge actuator of FIG. 7 from a different angle, in which the cooperating stop means are shown.

In the third angular position α3, the hinge actuator 10, as is represented in FIG. 7, can be pivoted into the extreme fold-over position. The extreme fold-over position, in this exemplary embodiment, as represented in FIG. 8, is defined by a cam 52 on the second hinge member 22, which cooperates with a stop 53 on the first hinge member 21.

The hinge actuator 10 can be adjusted back and forth between the fold-in position and the operating position with an electric motor, while a current strength limiter switches off the motor upon the second angular position, or a stop corresponding with the extreme fold-in position, being reached. Through an external force, the mirror housing 3 can be brought, for instance, into the extreme fold-over position, while the same drive, without adaptations, can cause the mirror housing 3 to pivot back to the fold-in position without the current limitation coming into operation. The displacement between the positions mentioned can take place with little friction, while the hinge construction in each case is statically determined, To define the operating position (α2), the guide track parts 23A, 23B can further be provided with recesses or elevations, not shown, at their track ends 26A, 25B.

Figure 9A:
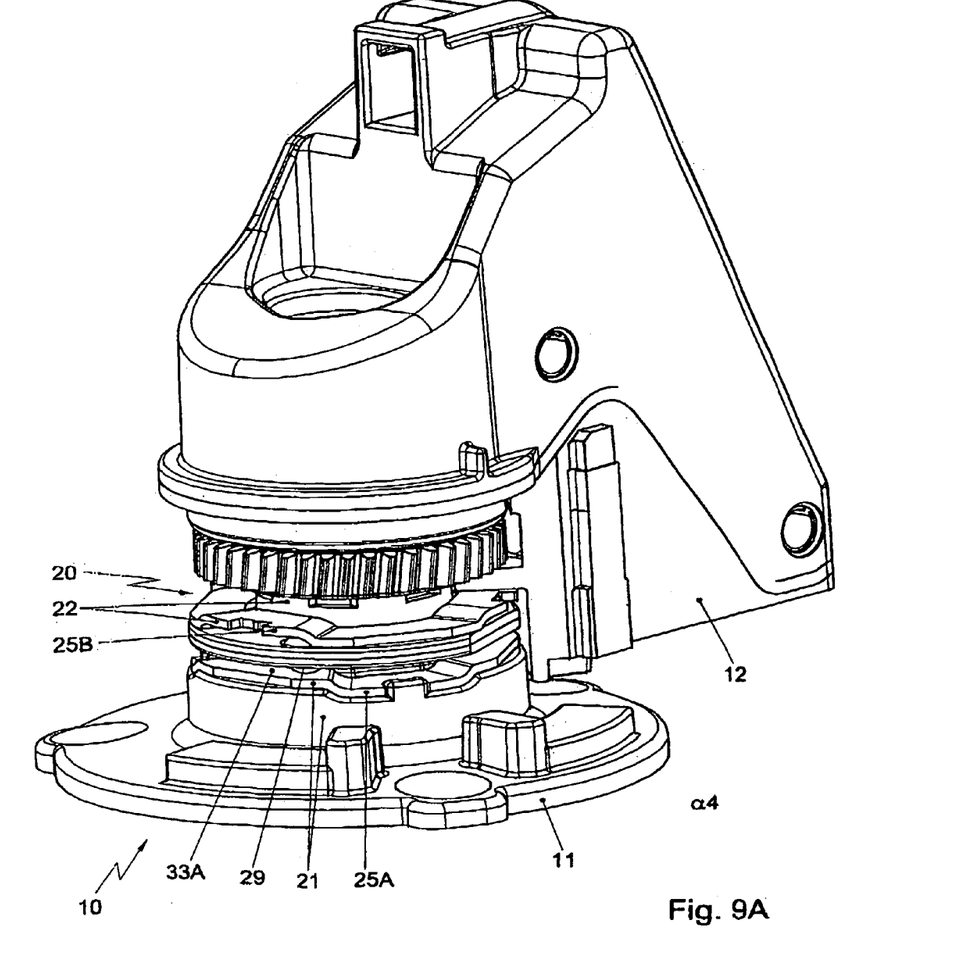
FIGS. 9A, 9B show a schematic perspective view of the hinge actuator of FIG. 1 in an intermediate angular position.
Figure 9B:
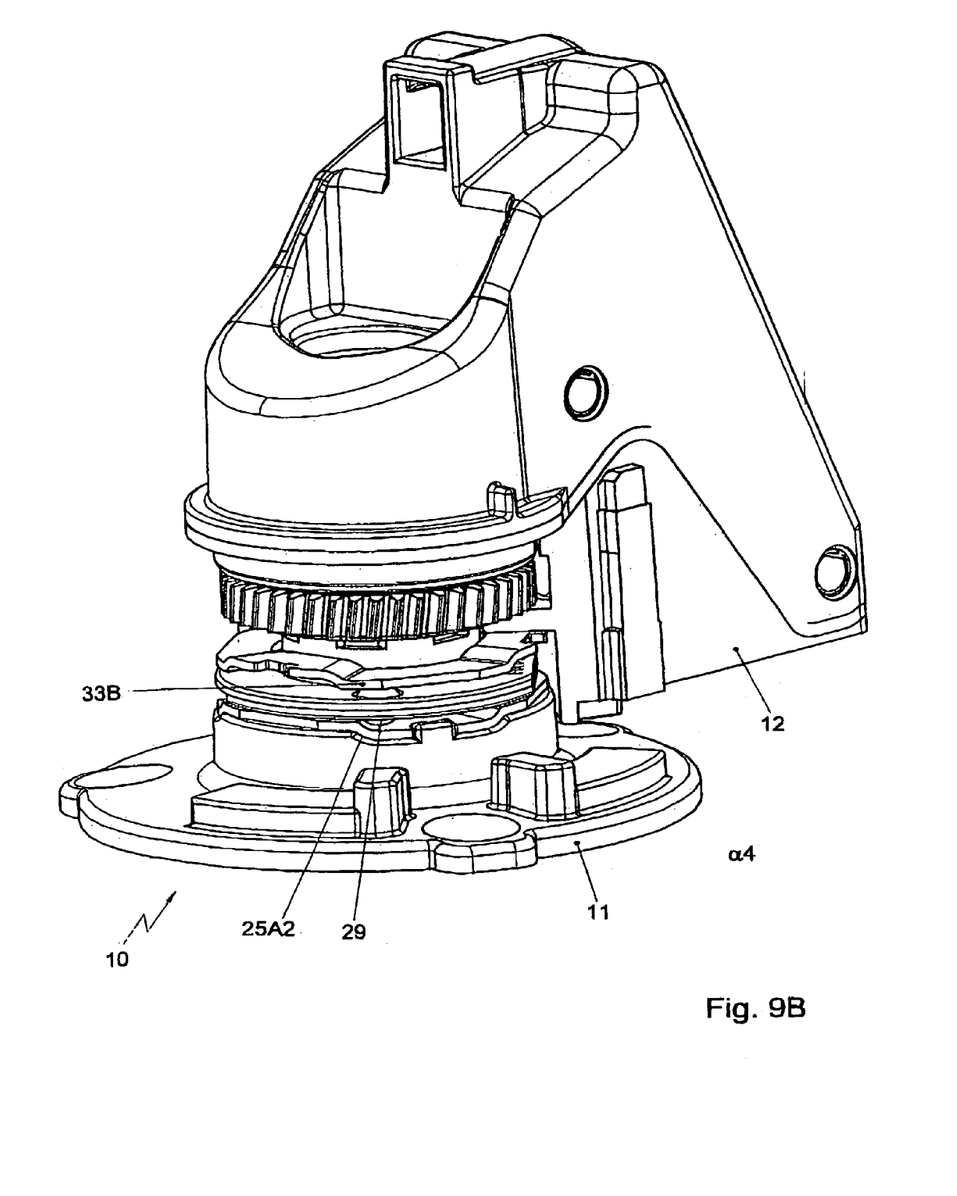

To ensure that the common carrier 29 with the guide elements 28 moves upon rotation in the direction of the arrow P from the second angular position α2 to the third angular position α3, the common carrier 29, as shown in FIG. 1, can be provided with a catch device which cooperates with at least one of the hinge members. The catch device is designed in FIG. 1 as a set of cams 54 arranged on the common carrier 29, which cams cooperate with the stops 55 arranged on the first hinge member 21 and the second hinge member 22, respectively. This prevents the occurrence of an intermediate angular position α4, shown in FIGS. 9A and 9B, in which at least one guide element 28 cooperates with a guide track part 23A/23B of a hinge member 21/22 on the one hand and with an auxiliary guide track part 33A/33B of another hinge member 21/22 on the other.

Figure 10A:
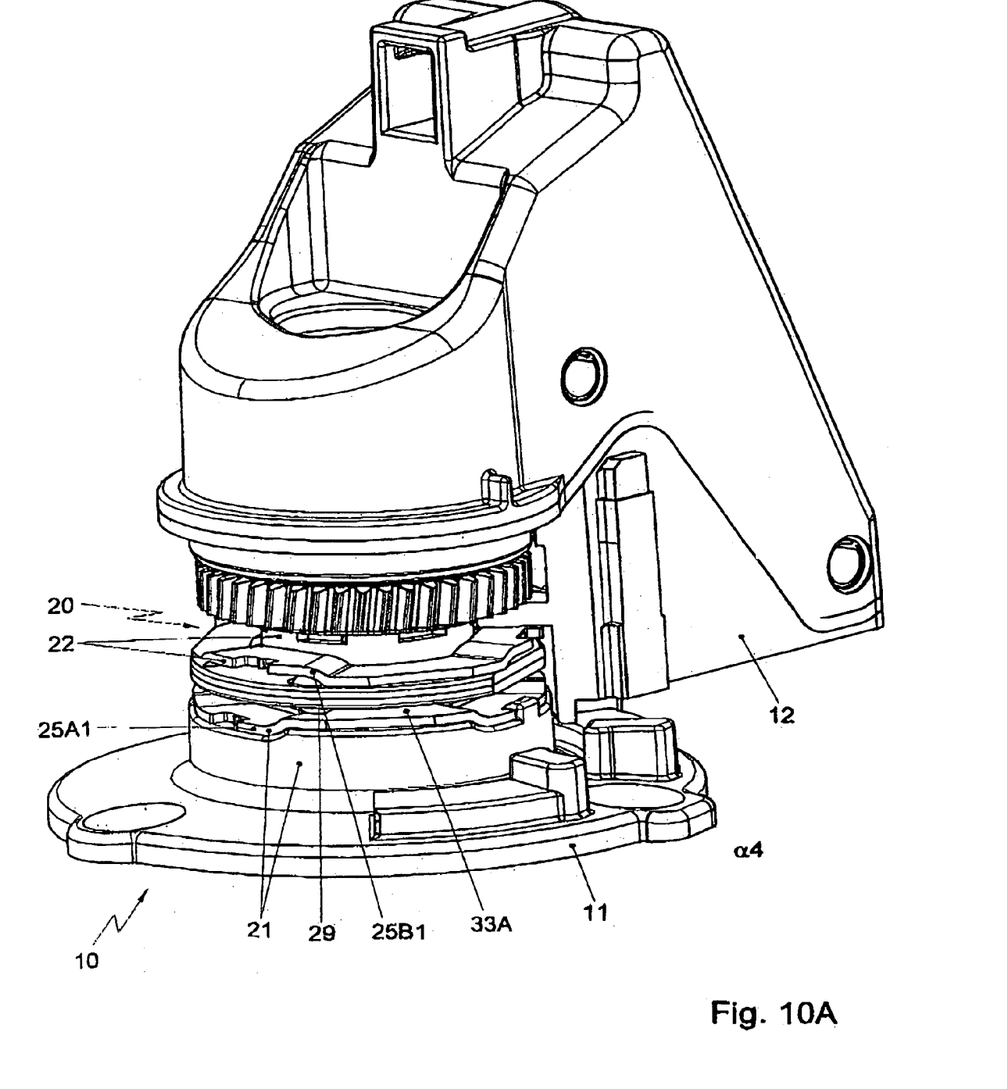
FIGS. 10A, 10B show a schematic perspective view of the hinge actuator of FIG. 1 in an intermediate angular position in which a limiter limits the pivotal motion of the hinge members relative to each other.
Figure 10B:
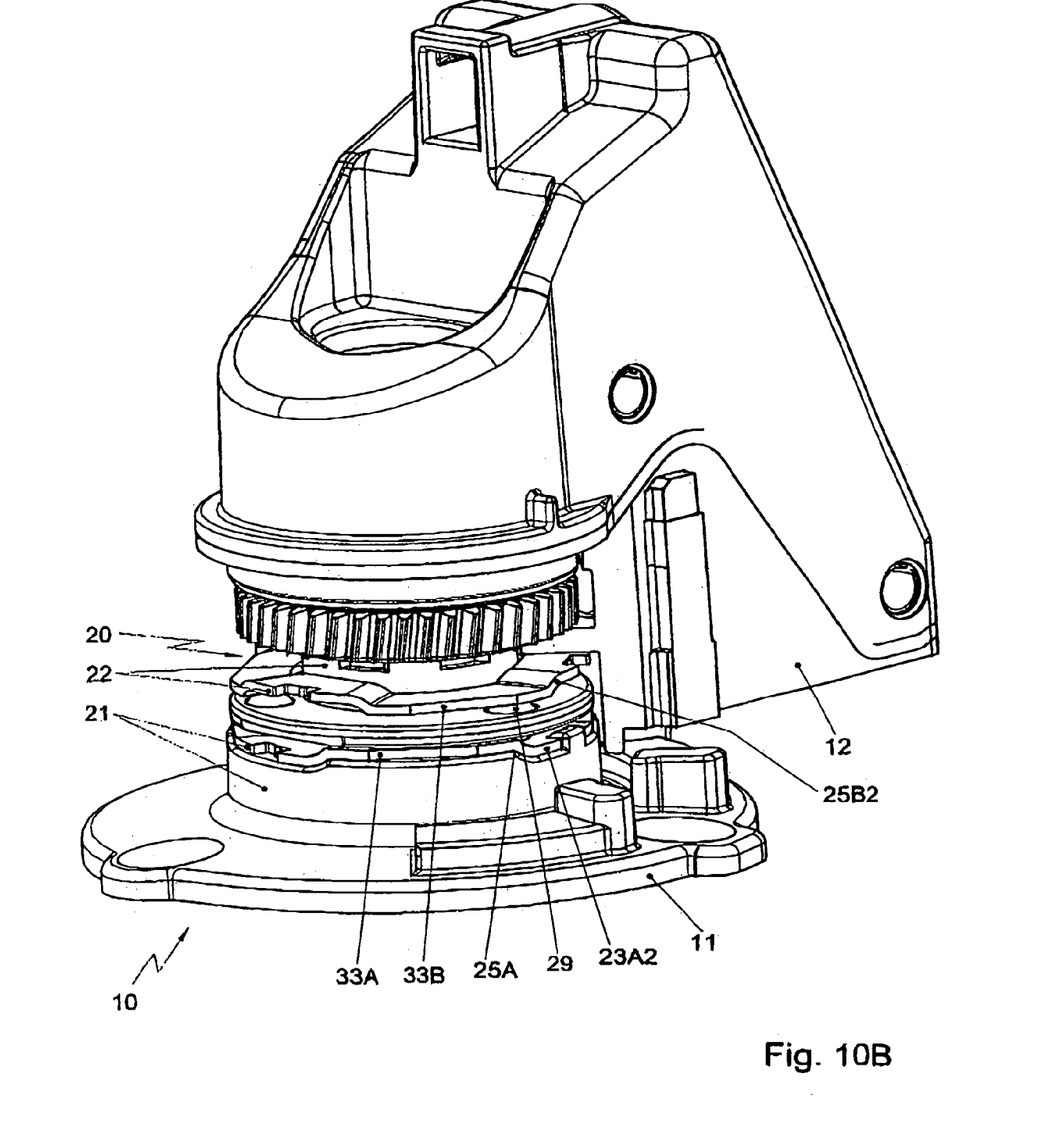
Figure 11:
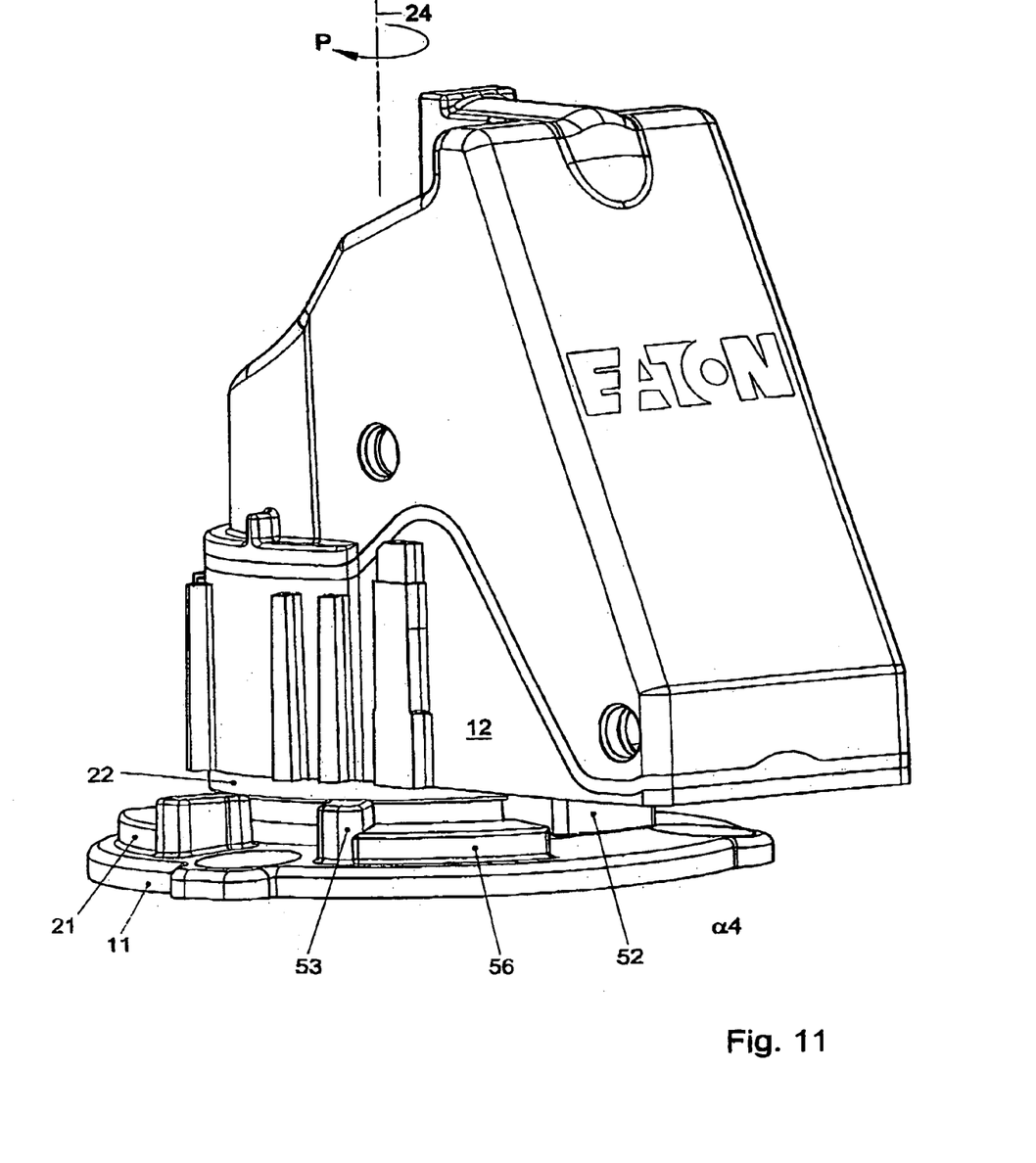
FIG. 11 shows a schematic perspective view of the hinge actuator of FIG. 10 from a different angle, showing the cooperating stops of the limiter.

The hinge construction 10 can further be provided, as shown in FIGS. 10A, 10B and 11, with a limiter which limits pivotal motion of the hinge members relative to each other when the hinge members 21/22 are in an intermediate angular position α4. Such a limiter preferably comprises a limiting stop 56 which extends between the hinge members 21/22 up to a length less than the sum of the distance between the planes in which the guide track parts 23A/23B and the auxiliary guide track parts 33A/33B in the two hinge members 21/22 are located.

In FIG. 11, it is shown that the limiter comes into operation when the hinge members are in the intermediate angular position α4. A comparison with FIG. 8 clearly shows that when the hinge members 21, 22 are in the third angular position α3, the cam 52 can still pass the limiting stop 56.

It is noted that the invention is not limited to the preferred embodiment described here with reference to the drawing, but that many variations are possible.

Thus, the first and second hinge members 21, 22 can be designed as flat annular discs, for instance die-cut from sheet metal. On mutually icing sides of the flat, annular discs, ridges may then be formed, whose contiguous top surfaces constitute the auxiliary guide track parts 33A/33B and whose edges define the first and second track ends 25A/25B.

Advantageously, the ridges may then be formed from resilient material, so that they deform to receive the guide elements when the hinge construction is moved from the second angular position α2 into the third angular position α3. In such a case, no axial displacement of the hinge members relative to the rotation axis is necessary.

These and other variants will be clear to those skilled in the art and are understood to fall within the scope of the invention as set forth in the following claims.

What is claimed is:

1. A hinge construction comprising:

first and second hinge members, each hinge member being provided with a guide track, wherein the first and second hinge members are arranged to be pivotable relative to a common rotation axis, wherein guide tracks of the first and second hinge members include at least three substantially flat, circular segment-shaped track parts and first and second track ends, the track parts extending between the first and second track ends and being distributed at substantially uniform intermediate distances over a corresponding circular circumference of the guide tracks, a plurality of guide elements distributed at fixed intermediate distances along the circumference of a circle located around the rotation axis; and a common carrier that supports the plurality of guide elements, wherein the common carrier is disposed between the guide tracks such that the guide tracks together form a guide for the plurality of guide elements, wherein the first and second hinge members are pivotable relative to each other between a first angular position in which the guide elements are received in the guides to be displaceable along the track parts, and a second angular position in which the plurality of guide elements are received in the guides so as to be clamped between first and second track ends of the track parts.

2. A hinge construction according to claim 1, wherein the track parts associated with each of the first and second hinge members are located in one flat plane.

3. A hinge construction according to claim 1 or 2, wherein the first and second hinge members are provided with auxiliary guide track parts linking up with the track parts, which auxiliary guide track parts pairwise form an auxiliary guide, such that the hinge members are pivotable further from the second angular position into a third angular position in which the guide elements are received in the auxiliary guides.

4. A hinge construction according to claim 3, wherein the auxiliary guide track parts per hinge member are located in one flat plane.

5. A hinge construction according to claim 3, wherein the guide tracks and the auxiliary guide track parts per hinge member link up via the track ends to form a stepped annular guide track.

6. A hinge construction according to claim 5, wherein the stepped annular track is formed from sheet material.

7. A hinge construction according to claim 1, wherein the guide elements are rolling elements, and wherein the common carrier is a cage in which the rolling elements are bearing-mounted.

8. A hinge construction according to claim 1, wherein the common carrier carries three guide elements.

9. A hinge construction according to claim 1, wherein the common carrier, with the aid of a catch device, cooperates with at least one of the hinge members.

10. A hinge construction according to claim 9, wherein the catch device comprises a cam placed on the common carrier, which cooperates with a stop arranged on a hinge member.

11. A hinge construction according to claim 3, wherein the hinge members are provided with a limiter which limits pivotal motion of the hinge members relative to each other when the hinge members are in an intermediate angular position in which at least one guide element cooperates with a guide track part of a first hinge member on the one hand and with an auxiliary guide track part of another hinge member on the other hand.

12. A hinge construction according to claim 11, wherein the limiter comprises a stop, which extends between the hinge members to a length less than the sum of the distance between the planes in which the track parts and the auxiliary guide track parts are located in the two hinge members.

13. A hinge construction according to claim 1, wherein the guide tracks of the hinge members cooperate in axial direction relative to the rotation axis.

14. A hinge construction according to claim 13, wherein the first and second hinge members cooperate in axial direction under spring action.

15. A hinge actuator, comprising:
a mirror base which carries a base shafts;
a frame part for a mirror housing; and
a hinge construction that connects the frame part with said base shaft so as to be pivotable relative to the base shaft, the hinge construction including
first and second hinge members, each hinge member being provided with a guide track, wherein the first and second hinge members are arranged to be pivotable relative to a common rotation axis, wherein guide tracks of the first and second hinge members include at least three substantially flat, circular segment-shaped track parts and first and second track ends, the track parts extending between the first and second track ends and being distributed at substantially uniform intermediate distances over a corresponding circular circumference of the guide tracks, a plurality of guide elements distributed at fixed intermediate distances along the circumference of a circle located around the rotation axis; and a common carrier that supports the plurality of guide elements, wherein the common carrier is disposed between the guide tracks such that the guide tracks together form a guide for the plurality of guide elements, wherein the first and second hinge members are pivotable relative to each other between a first angular position in which the guide elements are received in the guides to be displaceable along the track parts and a second angular position in which the plurality of guide elements are received in the guides so as to be clamped between first and second track ends of the track parts.

16. A hinge actuator according to claim 15, wherein the first hinge member is integrated with the mirror base and/or the second hinge member is integrated with the frame part for the mirror housing.

17. A wing mirror unit for a motor vehicle, comprising:
a hinge construction having
first and second hinge members, each hinge member being provided with a guide track, wherein the first and second hinge members are arranged to be pivotable relative to a common rotation axis, wherein guide tracks of the first and second hinge members include at least three substantially flat, circular segment-shaped track parts and first and second track ends, the track parts extending between the first and second track ends and being distributed at substantially uniform intermediate distances aver a corresponding circular circumference of the guide tracks, a plurality of guide elements distributed at fixed intermediate distances along the circumference of a circle located around the rotation axis; and a common carrier that supports the plurality of guide elements, wherein the common carrier is disposed between the guide tracks such that the guide tracks together form a guide for the plurality of guide elements, wherein the first and second hinge members are pivotable relative to each other between a first angular position in which the guide elements are received in the guides to be displaceable along the track parts, and a second angular position in which the plurality of guide elements are received in the guides so as to be clamped between first and second track ends of the track parts.

* * * * *